(12) United States Patent
Chang et al.

(10) Patent No.: US 10,299,148 B2
(45) Date of Patent: May 21, 2019

(54) METHOD FOR PROVIDING WIRELESS LAN SERVICE AND ELECTRONIC DEVICE THEREFOR

(71) Applicant: Samsung Electronics Co., Ltd., Gyeonggi-do (KR)

(72) Inventors: Duk-Hyun Chang, Gyeonggi-do (KR); Sung-Rae Cho, Gyeonggi-do (KR); Hyoung-Joo Lee, Gyeonggi-do (KR); Chae-Man Lim, Seoul (KR); Jung-Woo Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 44 days.

(21) Appl. No.: 14/949,355

(22) Filed: Nov. 23, 2015

(65) Prior Publication Data

US 2016/0150429 A1 May 26, 2016

(30) Foreign Application Priority Data

Nov. 21, 2014 (KR) .......................... 10-2014-0163468

(51) Int. Cl.
*H04W 24/08* (2009.01)
*H04L 12/807* (2013.01)
(Continued)

(52) U.S. Cl.
CPC ............. *H04W 24/08* (2013.01); *H04L 47/27* (2013.01); *H04L 61/2007* (2013.01);
(Continued)

(58) Field of Classification Search
CPC ..... H04W 48/06; H04W 48/16; H04W 48/20; H04W 72/02; H04W 72/04;
(Continued)

(56) References Cited

U.S. PATENT DOCUMENTS 7,650,151 B2 * 1/2010 Medepalli ........... H04W 72/085
370/232
8,363,630 B2 * 1/2013 Gong .................... H04W 48/16
370/338
(Continued)

FOREIGN PATENT DOCUMENTS

CN 1815915 8/2006
CN 101123802 2/2008
(Continued)

OTHER PUBLICATIONS

European Search Report dated Apr. 19, 2016 issued in counterpart application No. 15195617.4-1854, 9 pages.
(Continued)

*Primary Examiner* — Alpus Hsu
(74) *Attorney, Agent, or Firm* — The Farrell Law Firm, P.C.

(57) ABSTRACT

A device and a method for providing a wireless LAN service in an electronic device are provided. The electronic device includes a communication interface that transmits and receives a signal for a wireless LAN service; and a processor that selects a plurality of channels using the communication interface and based on channel scan information, accesses at least one Access Point (AP) corresponding to at least one channel among the plurality of channels, and monitors the plurality of channels in a state in which the access to at least one AP is maintained.

8 Claims, 12 Drawing Sheets

(51) Int. Cl.
*H04L 29/12* (2006.01)
*H04W 48/20* (2009.01)
*H04W 84/12* (2009.01)
*H04W 88/08* (2009.01)

(52) U.S. Cl.
CPC ......... *H04L 61/6022* (2013.01); *H04W 48/20* (2013.01); *H04W 84/12* (2013.01); *H04W 88/08* (2013.01)

(58) Field of Classification Search
CPC ......... H04W 72/0433; H04W 72/0486; H04W 72/0493; H04W 72/1226; H04W 72/1252; H04W 72/1257; H04W 84/02; H04W 84/12; H04W 92/045
See application file for complete search history.

(56) References Cited

U.S. PATENT DOCUMENTS

| | | | | |
|---|---|---|---|---|
| 9,042,324 B2* | 5/2015 | Zhang | ................... | H04W 72/04 370/329 |
| 9,167,622 B2* | 10/2015 | Homchaudhuri | ..... | H04W 88/06 |
| 9,204,367 B2* | 12/2015 | Sung | ................... | H04W 48/08 |
| 9,408,187 B2* | 8/2016 | Kneckt | ................. | H04W 72/02 |
| 9,433,016 B2* | 8/2016 | Yang | ................. | H04W 74/0816 |
| 9,538,555 B2* | 1/2017 | Park | ................. | H04W 74/0808 |
| 10,044,416 B2 | 8/2018 | Kwon et al. | | |
| 2004/0039817 A1 | 2/2004 | Lee et al. | | |
| 2005/0153702 A1* | 7/2005 | Cuffaro | ................. | H04W 16/08 455/452.1 |
| 2006/0109815 A1* | 5/2006 | Ozer | ................... | H04W 48/16 370/329 |
| 2007/0248058 A1* | 10/2007 | Fajardo | ................. | H04W 24/00 370/338 |
| 2007/0258384 A1* | 11/2007 | Sammour | ............. | H04W 36/24 370/252 |
| 2009/0137247 A1* | 5/2009 | Mok | ..................... | H04W 48/16 455/434 |
| 2010/0098048 A1* | 4/2010 | Kang | ................... | H04L 12/413 370/345 |
| 2011/0149766 A1 | 6/2011 | Choi et al. | | |
| 2011/0205990 A1 | 8/2011 | Inada | | |
| 2012/0163216 A1* | 6/2012 | Park | ................... | H04W 74/085 370/252 |
| 2015/0222447 A1 | 8/2015 | Park et al. | | |
| 2015/0264614 A1* | 9/2015 | Stager | ............... | H04W 36/0061 370/332 |
| 2016/0088441 A1* | 3/2016 | Mohammad Mirzaei | ................... | H04W 4/04 370/338 |

FOREIGN PATENT DOCUMENTS

| | | |
|---|---|---|
| CN | 102164378 | 8/2011 |
| CN | 103533604 | 1/2014 |
| KR | 1020100065097 | 6/2010 |
| KR | 1020110071884 | 6/2011 |
| WO | WO 2014/042464 | 3/2014 |

OTHER PUBLICATIONS

Chinese Office Action dated Jul. 30, 2018 issued in counterpart application No. 201510817689.1, 24 pages.
Chinese Office Action dated Mar. 21, 2019 issued in counterpart application No. 201510817689.1, 21 pages.

* cited by examiner

METHOD FOR PROVIDING WIRELESS LAN SERVICE AND ELECTRONIC DEVICE THEREFOR

PRIORITY

This application claims priority under 35 U.S.C. § 119(a) to Korean Patent Application Serial No. 10-2014-0163468, which was filed in the Korean Intellectual Property Office on Nov. 21, 2014, the entire content of which is incorporated herein by reference.

BACKGROUND

1. Field of the Disclosure

The present disclosure generally relates to a device and a method for providing a wireless LAN service in an electronic device.

2. Description of the Related Art

As mobile data use increases due to the vitalization of the smart phone market, data transmission that utilizes a wireless LAN network is increasing. For example, establishing the wireless LAN is easy, and wireless LAN may be used for free or at a low price. In addition, in the case of IEEE 802.11ac standard, the wifeless LAN has an advantage in which a fast data transmission of a maximum Gbps level is possible. Thus, the use of the wireless LAN is increasing.

The wireless LAN network may use an Access Point (AP) that is simultaneously supportable for a plurality of channels (e.g., 2.4 GHz and 5 GHz) or may use a multi-antenna technique in order to solve problems in which Internet use through the wireless LAN network is limited because of a channel interference due to an improper installation of APs.

In the case of a wireless LAN network, since one electronic device accesses one AP through a single channel, the wireless LAN network cannot effectively respond to a change of a wireless LAN environment. For example, when an electronic device accesses an AP that is simultaneously supportable for a plurality of channels (e.g., a channel A and a channel B), the electronic device may access a corresponding AP by selecting one channel to perform communication. Therefore, when the electronic device accesses the AP using the channel A among channels that may be supported by the AP simultaneously, one or more another electronic devices may access a corresponding AP using the channel A. Therefore, problems with data transmission and reception may increase regardless of the state of remaining channels (e.g., the channel B) of the AP. Thus, a service satisfaction of the wireless LAN network may be degraded.

The wireless LAN network may increase a data transmission rate or improve a data transmission reliability using an electronic device and an AP that includes a plurality of antennas. However, the electronic device uses the plurality of antennas for one operation (e.g., a data transmission or reception), and thus the electronic device cannot effectively respond to a change of the wireless LAN environment.

SUMMARY

According to an aspect of the present disclosure, a device and a method for effectively coping with a change of a wireless LAN environment in an electronic device are provided.

According to an aspect of the present disclosure, a device and a method for effectively coping with a change of a wireless LAN environment by using a plurality of channels or a plurality of APs in an electronic device are provided.

According to an aspect of the present disclosure, a device and a method for effectively coping with a change of a wireless LAN environment by independently operating a plurality of antennas in an electronic device are provided.

According to an aspect of the present disclosure, an electronic device includes a communication interface that transmits and receives a signal for a wireless LAN service; and a processor that selects a plurality of channels using the communication interface and based on channel scan information, accesses at least one Access Point (AP) corresponding to at least one channel among the plurality of channels, and monitors the plurality of channels in a state in which the access of at least one AP is maintained.

According to an aspect of the present disclosure, an electronic device includes a communication interface that transmits and receives a signal for a wireless LAN service; and a processor that controls to identify a plurality of Access Points (APs) using the communication interface and based on channel scan information, selects at least one AP among the APs based on monitoring information for a channel of the APs, and transmits data through at least one selected AP.

According to an aspect of the present disclosure, a method for operating an electronic device includes performing a channel scan; selecting a plurality of channels based on channel scan information; accessing at least one Access Points (APs) corresponding to at least one channel among the plurality of channels; and monitoring the plurality of channels in a state in which the access to at least one AP is maintained.

According to an aspect of the present disclosure, a method for operating an electronic device includes performing a channel scan; identifying a plurality of Access Points (APs) based on information on the channel scan; monitoring a channel of the APs; selecting at least one AP among the APs based on information on the monitoring of the channel; and transmitting data through at least one selected AP.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION

Figure 1:
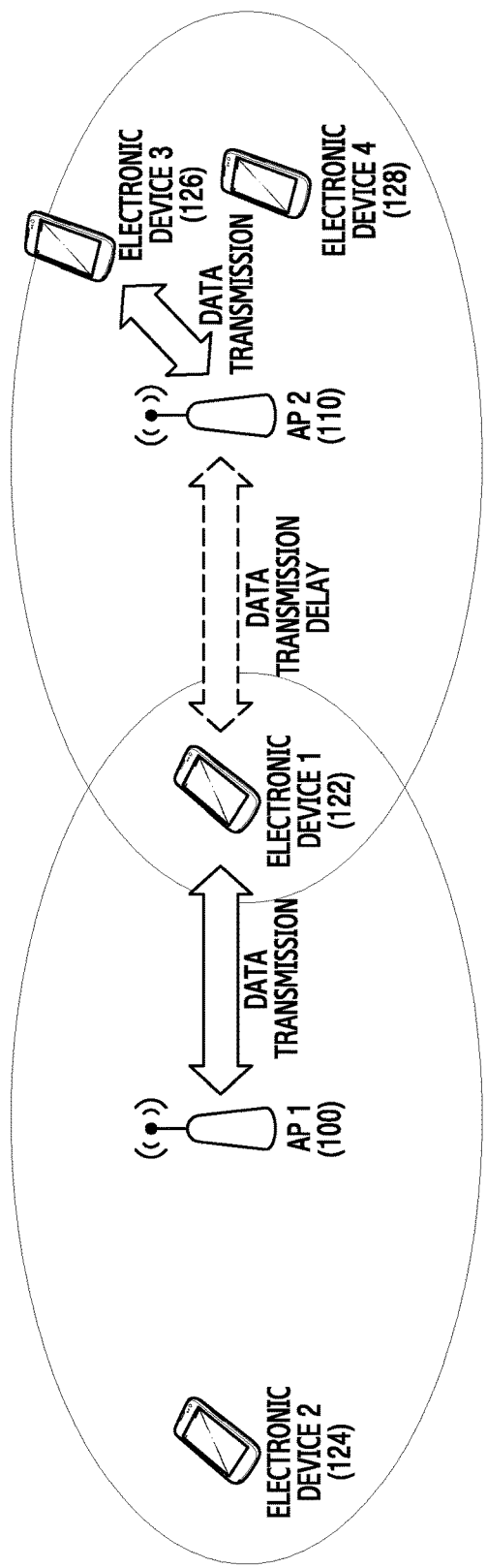
FIG. 1 illustrates a configuration of a wireless LAN network according to an embodiment of the present disclosure.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" as used herein indicate the presence of disclosed corresponding functions, operations, elements, and the like, and do not limit additional one or more functions, operations, elements, and the like. In addition, it should be understood that the terms "include" or "have" as used herein are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" as used herein include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" as used herein may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be referred to as a second element without departing from the scope of the present disclosure, and similarly, a second element may be referred to as a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" as used herein may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in describing the various embodiments of the present disclosure.

An electronic device according to various embodiments of the present disclosure, for example, may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mounted-device (HMD), an electronic glasses, an electronic clothing, an electronic bracelet, an electronic necklace, an electronic accessory, an electronic tattoo, a smart mirror, or a smart watch).

In other embodiments, an electronic device may be a smart home appliance, for example, a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In other embodiments, an electronic device may include at least one of a medical equipment (e.g., a mobile medical device (e.g., a blood glucose monitoring device, a heart rate monitor, a blood pressure monitoring device or a temperature meter), a magnetic resonance angiography (MRA)

machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller machine (ATM) of a financial institution, a point of sale (POS) device at a retail store, or an Internet of Things device (e.g., a lightbulb, various sensors, an electronic meter, a gas meter, a sprinkler, a fire alarm, a thermostat, a streetlamp, a toaster, a sporting equipment, a hot-water tank, a heater, or a boiler and the like).

In certain embodiments, an electronic device may include at least one of a piece of furniture or a building/structure; an electronic board; an electronic signature receiving device; a projector; and various measuring instruments (e.g., a water meter, an electricity meter, a gas meter, or a wave meter).

An electronic device according to various embodiments of the present disclosure may also include a combination of one or more of the above-mentioned devices.

Further, it will be apparent to those skilled in the art that an electronic device according to various embodiments of the present disclosure is not limited to the above-mentioned devices.

Herein, the term "user" may indicate a person who uses an electronic device or a device (e.g., an artificial intelligence electronic device) that uses the electronic device.

Hereinafter, the present disclosure may describe a technique for adaptively providing a wireless LAN service in response to a change of a wireless LAN environment in an electronic device.

FIG. 1 illustrates a configuration of a wireless LAN network according to an embodiment of the present disclosure.

Referring to FIG. 1, at least one electronic device of an electronic device 1 122 and an electronic device 2 124 positioned in a service area of an Access Point (AP) 1 100 may access the AP1 100. For example, when the electronic device 1 122 and the electronic device 2 124 access the AP 1 100 using the same channel (e.g., a channel A (e.g., at 2.4 GHz) or a channel B (e.g., at 5 GHz)), the electronic device 1 122 and the electronic device 2 124 may transmit and receive data through the AP 1 100.

At least one electronic device among the electronic device 1 122, an electronic device 3 126 and an electronic device 4 128 positioned in a service area of an AP 2 110 may access the AP2 110. For example, when the electronic device 1 122, the electronic device 3 126 and the electronic device 4 128 access the AP 2 110 using the same channel (e.g., the channel A or the channel B), the electronic device 1 122, the electronic device 3 126, and the electronic device 4 128 may transmit and receive data through the AP 2 110.

According to an embodiment, the electronic device 1 122 may access at least one AP of the AP 1 100 and the AP 2 110 using different channels to monitor channels of the AP 1 100 and the AP 2 110. The electronic device 1 122 may select at least one channel based on a monitoring result to transmit data. For example, the electronic device 1 122 may transmit data through the AP 1 100 based on the monitoring result (e.g., channel state information) for the channel of the AP 2 110 through which a data transmission by the electronic device 3 126 takes place. For example, when the electronic device 1 122 includes a plurality of antennas, the electronic device 1 122 may monitor the channel of the AP 2 110 through a second antenna while transmitting data through the AP 1 100 through a first antenna.

According to an embodiment, when the electronic device 1 122 is positioned in the service area of the AP 1 100 and the AP 2 110 using the same channel, the electronic device 1 122 may access at least one AP of the AP 1 100 and the AP 2 110 to monitor the channel of the AP 1 100 and the AP 2 110. The electronic device 1 122 may access at least one AP based on a monitoring result to transmit data. For example, when the electronic device 3 126 transmits data through the AP 2 110, the electronic device 1 122 may transmit data through the AP 1 100. For example, when the electronic device 1 122 includes a plurality of antennas, the electronic device 1 122 may monitor a corresponding channel through a second antenna while transmitting data through the AP 1 100 through a first antenna.

According to an embodiment, the electronic device 1 122 may access one AP of APs (e.g., the AP 1 100 and the AP 2 110), which may be accessed using a MAC address allocated to a communication interface. For example, the electronic device 1 122 may access the AP 1 100 to transmit and receive data. When the electronic device 1 122 attempts to transmit data through the AP 2 110 based on a monitoring result for a channel, the electronic device 1 122 may access the AP 2 110 to transmit and receive the data after releasing the access to the AP 1 100.

According to an embodiment, the electronic device 1 122 may access at least one AP (e.g., the AP 1 100 or the AP 2 110) using a plurality of MAC addresses allocated to the communication interface. For example, when the electronic device 1 122 includes one communication interface, after the electronic device 1 122 access the AP 1 100 by configuring the communication interface with a first MAC address, the electronic device 1 122 may access the AP 2 110 by changing the first MAC address of the communication interface to a second MAC address. In this case, the electronic device 1 122 may access the AP 2 110 by changing the MAC address of the communication interface to the second MAC address in a state in which the access to the AP 1 100 is maintained. For example, when the electronic device 1 122 includes a plurality of communication interfaces, the electronic device 1 122 may access the AP 1 100 through a first communication interface configured using a first MAC address, and may access the AP 2 110 through a second communication interface configured using a second MAC address.

According to an embodiment, the electronic device 1 122 may expand a MAC address allocated to the communication interface to access at least one AP (e.g., the AP 1 100 or the AP 2 110). For example, when the electronic device 1 122 includes one communication interface, after the electronic device 1 122 accesses the AP 1 100 by configuring the communication interface with the MAC address (or a first expanded MAC address), and the electronic device 1 122 may access the AP 2 110 by changing the MAC address of the communication interface to the expanded MAC address (or a second expanded MAC address). In this case, the electronic device 1 122 may access the AP 2 110 by changing the MAC address of the communication interface to the expanded MAC address (or the second expanded MAC address) in a state in which the access to the AP 1 100 is maintained. For example, when the electronic device 1 122 includes a plurality of communication interfaces, the electronic device 1 122 may access the AP 1 100 through a first communication interface configured with the first expanded MAC address and may access the AP 2 110 through a second communication interface configured with the second expanded MAC address.

According to an embodiment, the electronic device 1 122 may access at least one AP using an IP address allocated from at least one AP (e.g., the AP 1 100 or the AP 2 110). Each AP (e.g., the AP 1 100 and the AP 2 110) may divide data transmitted to the electronic device 1 122 using different IP addresses allocated to the electronic device 1 122. In this case, the wireless LAN network may allocate different IP addresses to the same MAC address of the electronic device 1 122 by changing a Dynamic Host Configuration Protocol (DHCP) server.

According to an embodiment, at least one AP of the AP 1 100 and the AP 2 110 may simultaneously support different channels (e.g., a channel at a 2.4 GHz band and a channel at a 5 GHz band).

In various embodiments of the present disclosure, the AP may simultaneously support a plurality of channels. The electronic device may select one channel among a plurality of channels supported by a corresponding AP by monitoring the plurality of channels simultaneously supported by the AP to transmit data.

Figure 2:
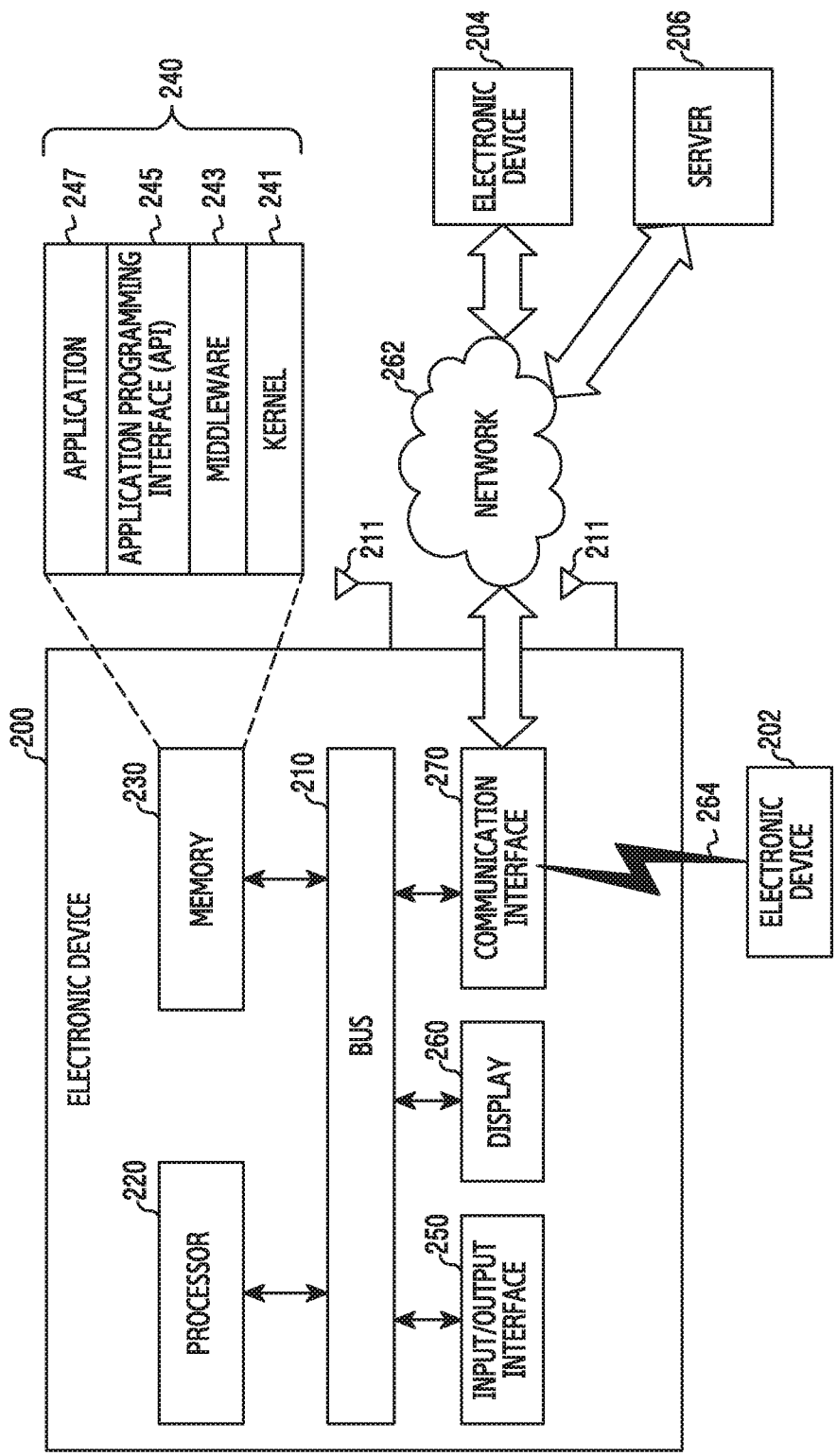
FIG. 2 illustrates a block diagram of an electronic device according to an embodiment of the present disclosure.

FIG. 2 illustrates a block diagram of an electronic device according to an embodiment of the present disclosure.

Referring to FIG. 2, an electronic device 200 (e.g., the electronic device 1 122) may include a bus 210, a processor 220, a memory 230, an input/output interface 250, a display 260, a communication interface 270, and a plurality of antennas 211. For example, the electronic device 200 may omit at least one of the elements or add other elements.

The bus 210 may connect above-mentioned elements (e.g., the processor 220, the memory 230, the input/output interface 250, the display 260 and the communication interface 270) and may be a circuit transferring a communication (e.g., a control message) among the elements.

The processor 220 may include one or more of a Central Processing Unit (CPU), an Application Processor (AP), and a Communication Processor (CP). The processor 220, for example, may carry out operations or data processing relating to the control and/or communication of at least one other element of the electronic device 200.

According to an embodiment, the processor 220 may monitor at least one channel which may be accessed through the communication interface 270. For example, the processor 220 may select at least one channel based on a monitoring result to transmit data. For example, the processor 220 may select at least one AP based on the monitoring result to transmit data.

According to an embodiment, the processor 220 may select a channel for transmitting data based on the state (e.g., an idle state or a busy state) of the channel. For example, the processor 220 may select a currently unused channels (e.g., an idle state channel) among available channels.

According to an embodiment, when the number of currently unused channels among the channels that may be accessed by the electronic device 200 are more than one, the processor 220 may select at least one channel for transmitting data based on a priority of the channels.

According to an embodiment, when the number of currently unused channels among the channels that may be accessed by the electronic device 200 are more than one, the processor 220 may select at least one channel for transmitting data based on at least one of a signal strength (e.g., a Received Signal Strength Indication (RSSI)) of a corresponding channel and a medium access state. For example, the medium access state may include at least one of a contention window (CW) and a Network Allocation Vector (NAV). For example, the contention window (CW) may indicate the size of a section in which a backoff is performed such that the electronic device 200 obtains a medium (e.g., AP) for communication through a corresponding channel. The size of the contention window (CW) may increase whenever obtaining a medium fails. For example, the NAV is a value configured for a virtual medium use sensing (or virtual carrier sensing). The electronic device 200 may not monitor a corresponding channel by determining that the corresponding channel is used (or busy) during the NAV.

According to an embodiment, the processor 220 may select a channel for transmitting data based on the time it takes to obtain a medium (e.g., a time accessible to the AP). For example, when signal strengths, medium access states, and data transmission rates of accessible channels are similar, the processor 220 may select a channel for transmitting data based on medium obtaining times of each channel.

According to an embodiment, the processor 220 may select a channel for transmitting data based on an Expected Data Rate (EDR, or expected data transmission rate). For example, the processor 220 may calculate the EDR using the following Equation (1).

$$EDR \propto \frac{\text{Data\_rate}}{\text{Channel\_utilization}} \quad (1)$$

Data_rate ∝ signal_strength × bandwidth

Channel_utilization ∝ contention_window_size

In Equation (1), the EDR may be determined as a proportion of a data transmission rate (i.e., Data_rate) and a channel use rate (i.e., channel_utilization). The data transmission rate may be proportional to the signal strength (i.e., signal_strength) and bandwidth. The channel use rate may be proportional to the size of a contention window (or contention section).

According to an embodiment, the processor 220 may select at least one AP for transmitting data based on at least one of load information of the AP and a signal strength of the AP.

According to an embodiment, the processor 220 may control access to one AP among APs (e.g., the AP 1 100 and the AP 2 110) which may be accessed using a MAC address allocated to the communication interface 270. For example, when the electronic device 200 attempts to transmit data through the AP 2 110 based on a monitoring result in a state in which the electronic device 200 accesses the AP 1 100, the processor 220 may control access to the AP 2 110 after releasing the access to the AP 1 100.

According to an embodiment, the processor 220 may control access to at least one AP (e.g., the AP 1 100 or the AP 2 110) by using a plurality of MAC addresses allocated to the communication interface 270.

According to an embodiment, the processor 220 may control access to at least one AP (e.g., the AP 1 100 or the AP 2 110) by expanding a MAC address allocated to the communication interface 270.

According to an embodiment, the processor 220 may control access to at least one AP by using an IP address allocated from at least one AP (e.g., the AP 1 100 or the AP 2 110).

According to an embodiment, when the electronic device 200 includes the plurality of antennas 211, the processor 220 may monitor at least one channel through a second antenna while transmitting data through the AP (e.g., the AP 1 100) through a first antenna.

The memory 230 may include a volatile memory and/or a non-volatile memory, and may store a command or data related to at least one of other elements in the electronic device 200. According to an embodiment, the memory 230 may store software and/or a program 240. For example, the program 240 may include a kernel 241, a middleware 243, an Application Programming Interface (API) 245, an application program(s) 247 (or application), and the like. At least some of the kernel 241, the middleware 243, and the API 245 may be referred to as an Operating System (OS).

The kernel 241 may control or manage system resources (e.g., the bus 210, the processor 220, the memory 230, etc.) used for executing an operation or a function implemented in other programs (e.g., the middleware 243, the API 245, or the application program 247). The kernel 241 may provide an interface that enables the middleware 243, the API 245, or the application program 247 to access an individual component of electronic device 200 to control or manage the system resources.

The middleware 243 may function as an intermediary that makes the API 245 or the application program 247 communicate with the kernel 241 to exchange data. The middleware 243 may perform a control for a work request received from the application program 247. For example, the middleware 243 may perform a control (e.g., scheduling or load-balancing) for the work request by using, for example, a method of determining a sequence using system resources of the electronic device 200 with respect to at least one application among the application programs 247.

The API 245 may include an interface or a function (e.g. a command) used by the application programs 247 to control a function provided from the kernel 241 or the middleware 243. For example, the API 245 may include at least one interface such as a file control, a window control, an image processing and a character control.

The input/output interface 250 may function as an interface that may transfer instructions or data input from a user or another external device to the other element(s) of the electronic device 200. Also, the input/output interface 250 may output, to the user or another external device, commands or data received from the element(s) other than through the input/output interface 250 within the electronic device 200.

The display 260 may include, for example, a Liquid Crystal Display (LCD), a Light Emitting Diode (LED) display, an Organic Light Emitting Diode (OLED) display, a Micro Electra Mechanical System (MEMS) display, or an electronic paper display. The display 260, for example, may display various types of content (e.g., text, images, videos, icons, or symbols) for the user. The display 260 may include a touch screen and may receive, for example, a touch, gesture, proximity, or hovering input using an electronic pen or the user's body part, such as a finger.

The communication interface 270 may connect a communication between the electronic device 200 and an external electronic device (e.g., a first external electronic device 202, a second external electronic device 204 or a server 206). For example, the communication interface 270 may include at least one connection managing unit for managing each channel which may be accessed by the electronic device 200. For example, the communication interface 270 may be connected to a network 262 through wireless or wired communication to communicate with the external device. For example the wireless communication may include a short range communication, such as at least one of Wireless Fidelity (WiFi), Bluetooth, Near Field Communication (NFC), and Global Positioning System (GPS). Additionally or alternatively, the wireless communication may include a cellular communication protocol, such as at least one of Long Term Evolution (LTE), LTE-Advanced (LTE-A), Code Division Multiple Access (CDMA), Wide-CDMA (WCDMA), Universal Mobile Telecommunication System (UMTS), Wibro and Global System for Mobile communication (GSM), and the like. Also, the wired communication may include at least one of a Universal Serial Bus (USB), a High Definition Multimedia Interface (HDMI), Recommended Standard 142 (RS-142), a Plain Old Telephone Service (POTS), and the like.

The network 262 may include at least one of a communication network such as a computer network (e.g., a LAN or a WAN), the Internet, and a telephone network.

Figure 3:
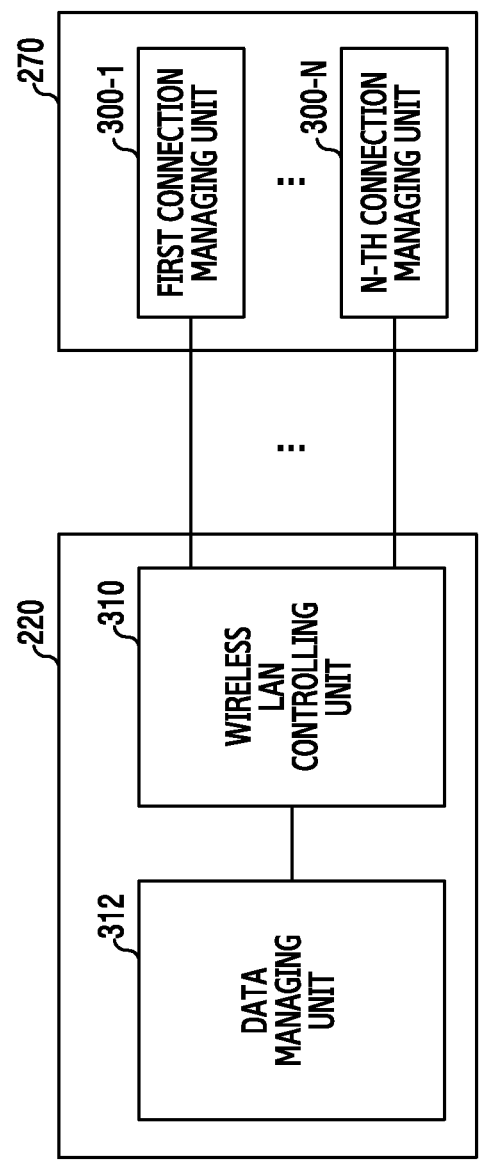
FIG. 3 illustrates a block diagram of a processor and a communication interface according to an embodiment of the present disclosure.

FIG. 3 illustrates a block diagram of a processor and a communication interface according to an embodiment of the present disclosure.

Referring to FIG. 3, a processor 220 may include a wireless LAN controlling unit 310 and a data managing unit 312. The communication interface 270 may include one or more connection managing units (300-1 to 300-N) for managing each channel, which may be accessed by the electronic device 200.

When the wireless LAN controlling unit 310 receives data transmission information from the data managing unit 312, the wireless LAN controlling unit 310 may obtain state information (e.g., monitoring information) for at least one channel from one or more connection managing units (300-1 to 300-N). The wireless LAN controlling unit 310 may select at least one channel or AP for transmitting data based on the state information for at least one channel.

According to an embodiment, when the wireless LAN controlling unit 310 selects a plurality of channels for transmitting data, the data managing unit 312 may control to transmit fragmented pieces of the data through the plurality of channels.

According to an embodiment, the data managing unit 312 may assemble the pieces of the data received through the plurality of channels into one piece of the data.

In the case of FIG. 2 and FIG. 3, the electronic device 200 may include the processor 220 controlling a wireless LAN service.

In other embodiments of the present disclosure, the electronic device 200 may include the processor 220 and a separate module for controlling the wireless LAN service.

According to various embodiments of the present disclosure, an electronic device (e.g., the electronic device 1 122 of FIG. 1 or the electronic device 200 of FIG. 2) may include a communication interface that transmits and receives a signal for a wireless LAN service, and may also include a processor that selects a plurality of channels using the communication interface, and based on channel scan information, accesses at least one Access Point (AP) corresponding to at least one channel among the plurality of channels, and monitors the plurality of channels in a state in which access to at least one AP is maintained.

The communication interface may include at least one connection managing unit which manages medium access states of each of the plurality of channels according to each channel. The processor may select a plurality of channels which are usable in the electronic device based on at least one of load information and supportable transmission rates of each channel.

The processor may control to access at least one AP using a plurality of MAC addresses allocated to the communication interface, an expansion address of a MAC address allocated to the communication interface, or a plurality of IP addresses allocated to the communication interface.

The processor may control to access different APs during different time periods using a MAC address allocated to the communication interface.

The processor may control to select at least one channel based on the monitoring information of the plurality of channels and to transmit data through at least one selected channel.

The processor may select at least one channel additionally using at least one of a priority, a signal strength, a medium access state, and a medium obtaining time of each channel based on load information of each channel, and the medium access state may include at least one of a contention window (CW) and a Network Allocation Vector (NAV).

The processor may select at least one channel based on expected data transmission rates of each channel.

A plurality of antennas may be further included. The processor may maintain the access to at least one AP using at least one antenna among the plurality of antennas, and may monitor the plurality of channels using at least one of the remaining antennas.

According to various embodiments of the present disclosure, an electronic device (e.g., the electronic device 1 122 of FIG. 1 or the electronic device 200 of FIG. 2) may include a communication interface that transmits and receives a signal for a wireless LAN service, and a processor that controls to identify a plurality of Access Points (APs) using the communication interface, and based on channel scan information, selects at least one AP among the APs based on monitoring information for a channel of the APs, and transmits data through at least one selected AP.

In various embodiments, the processor may select at least one AP for transmitting data based on at least one of load information and signal strengths of the APs.

Figure 4:
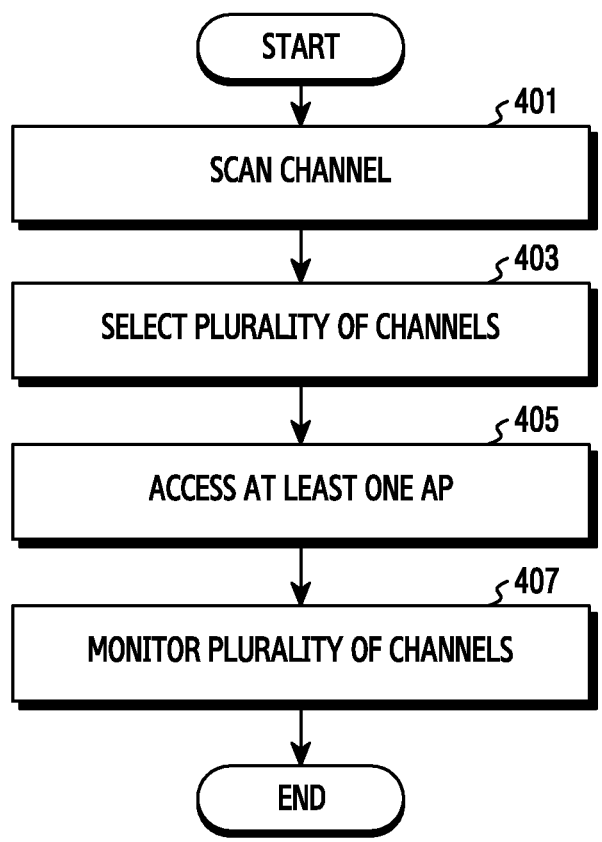
FIG. 4 illustrates a flowchart for monitoring a plurality of channels in an electronic device according to an embodiment of the present disclosure.

In various embodiments, the processor may select one channel based on the network complexity of a plurality of channels identified through the channel scan and may identify a plurality of Access Points (APs) that may be used in the selected channel. FIG. 4 illustrates a flowchart for monitoring a plurality of channels in an electronic device according to an embodiment of the present disclosure.

Referring to FIG. 4, in operation 401, an electronic device (e.g., the electronic device 1 122 of FIG. 1 or the electronic device 200 of FIG. 2) scans a channel. For example, the electronic device may obtain at least one of the numbers, signal strength, and state information of an AP that exists in each channel through a control message received through each channel. The control message may include a beacon message or a probe response message received from the AP. The state information of the AP may include at least one of load information and a supportable data transmission rate of the AP.

In operation 403, the electronic device selects a plurality of usable channels based on network environment information collected through the scan. For example, the electronic device may obtain a result shown in Table 1 through the channel scan. An SSID of Table 1 may indicate an identifier of a Basic Service Set (BSS) and an Extended Service Set (ESS) which are units of the wireless LAN service.

TABLE 1

| channel | AP address | SSID | Supported Rate | Load |
|---|---|---|---|---|
| 1 | AP_A | SSID_A | 1/2/5.5/6/9/11/12/12/18 | N |
| 3 | AP_B | SSID_B | 1/2/5.5/6/9/11/12 | N |
| 9 | AP_C | SSID_C | 1/2/5.5/6/9/11/12/18/24/36/48/54 | N |
| 13 | AP_D | SSID_D | 1/2/5.5/6/9/11/12/18/24/36/48 | Y |

The electronic device may select two channels, such as a channel 9 and a channel 1 based on a high sequence of a supportable data transmission rate among the channel 1, a channel 3, and the channel 9, of which a load may be allowed based on the scan result of Table 1.

In operation 405, the electronic device accesses at least one AP through at least one channel among the plurality of usable channels. For example, the electronic device may access an AP which supports one channel (e.g., the channel 9 of which the supportable data transmission rate is the highest) among the plurality of channels. The electronic device may access at least one AP through the plurality of usable channels (e.g., the channel 3 and the channel 9). The electronic device may also access at least one AP through the plurality of channels using at least one of a plurality of MAC addresses allocated to a communication interface (e.g., the communication interface 270), an expandable MAC address or IP addresses.

In operation 407, the electronic device monitors the plurality of usable channels. For example, when the electronic device accesses the AP through one channel, the electronic device may monitor at least one of the remaining channels while maintaining the access to the AP through the corresponding channel. For example, the electronic device may monitor the plurality of channels used in accessing at least one AP. The electronic device may obtain at least one of a signal strength and state information of the AP for each channel through the monitoring of the plurality of channels.

Figure 5:
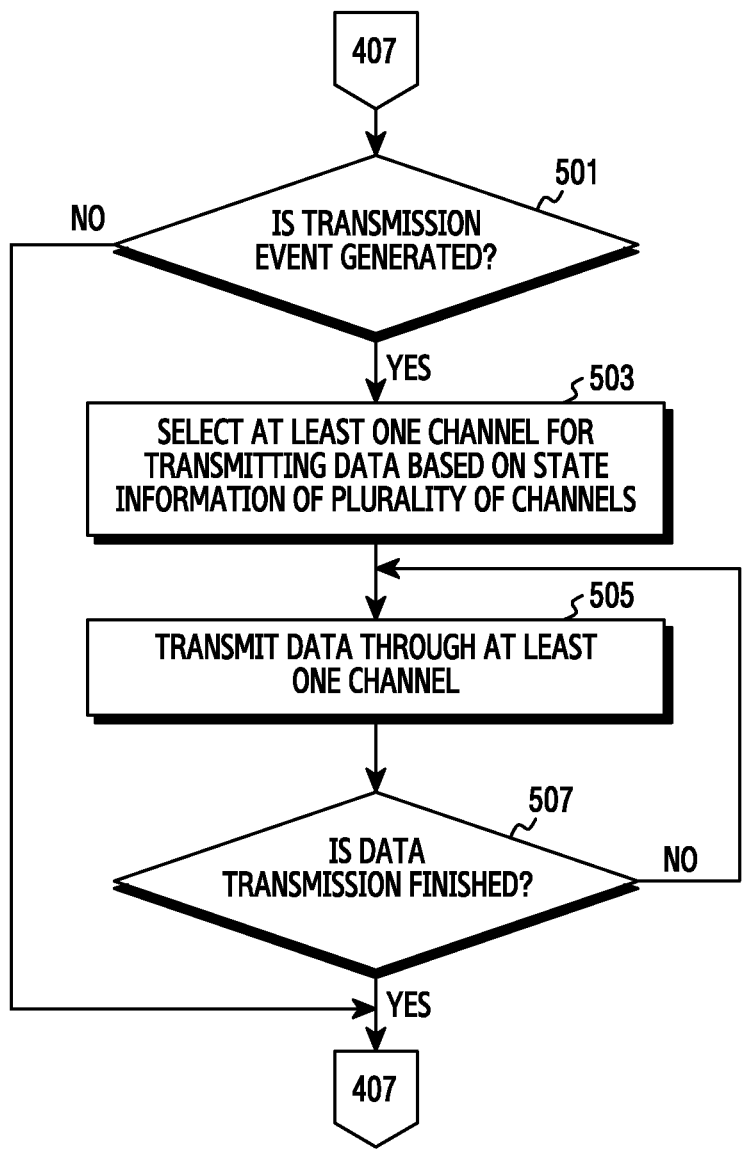
FIG. 5 illustrates a flowchart for transmitting data through at least one channel in an electronic device according to an embodiment of the present disclosure.
Figure 6:
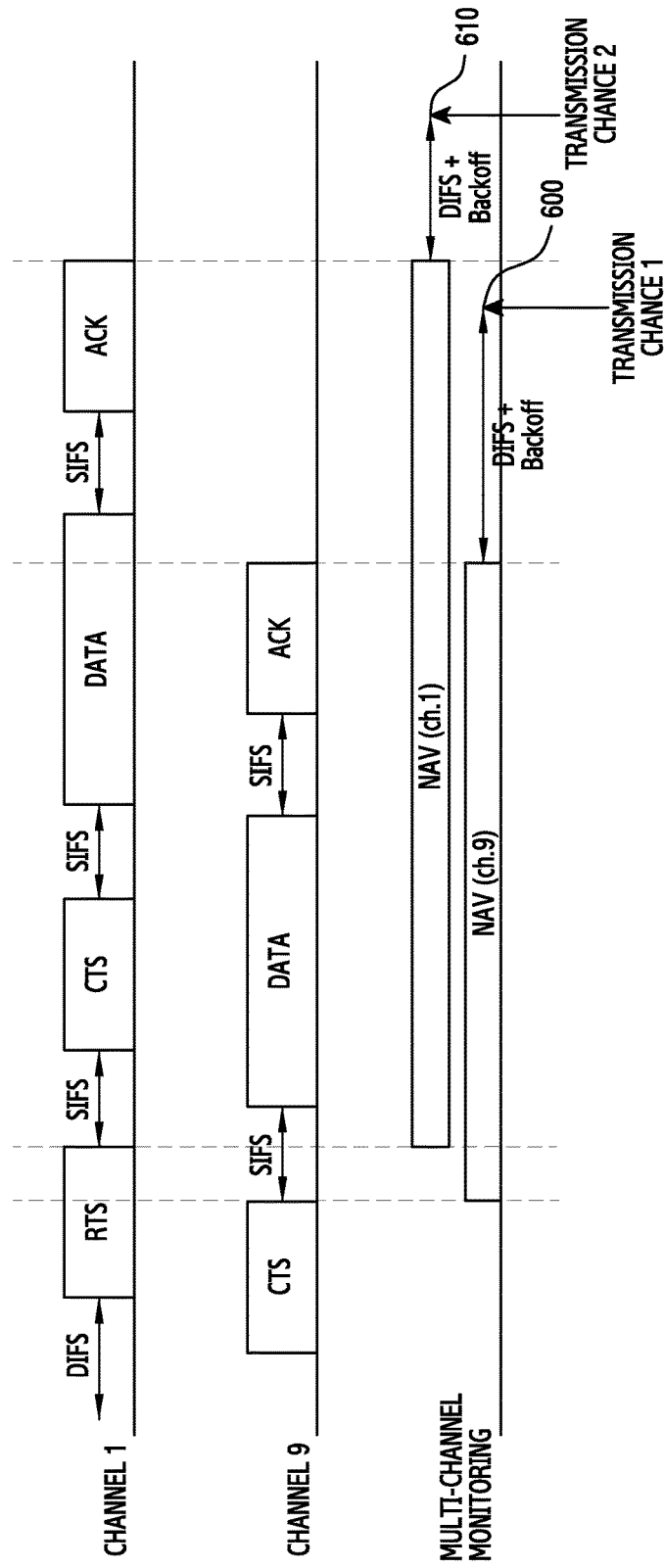
FIG. 6 illustrates a structure for selecting a channel for a data transmission in an electronic device according to an embodiment of the present disclosure.

FIG. 5 illustrates a flowchart for transmitting data through at least one channel in an electronic device according to an embodiment of the present disclosure. FIG. 6 illustrates a structure for selecting a channel for a data transmission in an electronic device according to an embodiment of the present disclosure. Hereinafter, an operation for transmitting data is described with reference to channel monitoring information of FIG. 6.

Referring to FIG. 5, in operation 501, an electronic device (e.g., the electronic device 1 122 or the electronic device 200 of FIG. 2) determines whether a transmission event is generated while monitoring (e.g., step 407 of FIG. 4) a plurality of channels. For example, the electronic device may identify whether data to be transmitted through a wireless LAN service is generated.

When the transmission event is not generated while monitoring the plurality of channels, the electronic device may monitor a plurality of usable channels.

In operation 503, when the transmission event is generated, the electronic device selects at least one channel for the data transmission based on monitored state information of the plurality of channels.

In an embodiment, the electronic device may select at least one channel for the to data transmission based on a state (e.g., an idle state or a busy state) of the channel. For example, when the electronic device selects the plurality of channels based on the state of the channel, the electronic device may select at least one channel for transmitting data based on a priority of the channels. When the electronic device selects the plurality of channels based on the state of the channel, the electronic device may select at least one channel for the data transmission based on at least one of a signal strength (e.g., an RSSI) or a medium access state of a corresponding channel.

According to an embodiment, the electronic device may select a channel for the data transmission based on a time taken to obtain a medium (e.g., a time when an access to an AP is possible). For example, as shown in FIG. 6, the electronic device monitors the channel 1 and the channel 9, the electronic device may obtain medium obtaining times 600 and 610 of each channel based on an NAV and a backoff of each channel. The electronic device may select a channel of which a medium obtaining time is fast. For example, the NAV of each channel may be determined based on a Request To Send (RTS), a Clear To Send (CTS), a Short InterFrame Space (SIFS) and a DCF InterFrame Space (DIFS).

According to an embodiment, the electronic device may select a channel for the data transmission based on an EDR.

In operation 505, the electronic device transmits data through at least one channel selected in operation 503.

In operation 507, the electronic device determines whether the data transmission is finished.

In operation 507, when the data transmission is not finished, the electronic device transmits data through at least one channel selected in operation 503.

When the data transmission is finished, the electronic device monitors a plurality of usable channels (e.g., step 407 of FIG. 4).

Figure 7:
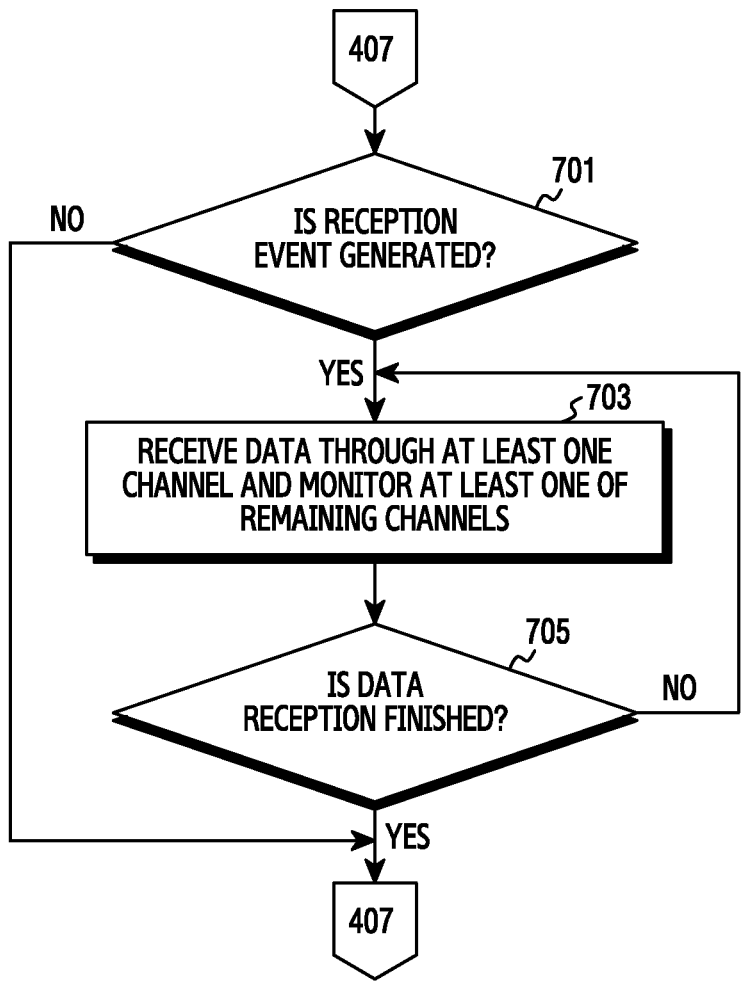
FIG. 7 illustrates a flowchart for receiving data through at least one channel in an electronic device according to an embodiment of the present disclosure.

FIG. 7 illustrates a flowchart for receiving data through at least one channel in an electronic device according to an embodiment of the present disclosure.

Referring to FIG. 7, in operation 701, an electronic device (e.g., the electronic device 1 122 of FIG. 1 or the electronic device 200 of FIG. 2) determines whether a reception event is generated while monitoring a plurality of channels (e.g., step 407 of FIG. 4). For example, the electronic device may determine whether a message indicating whether received data exists is received through at least one channel among the plurality of channels. For example, the message indicating whether the received data exists may include a Traffic Indication Message (TIM) and a Delivery TIM (DTIM).

When the reception event is not generated while monitoring the plurality of channels, the electronic device monitors a plurality of usable channels.

In operation 703, when the reception event is generated, the electronic device receives data through at least one channel among the plurality of channels. At this time, the electronic device may monitor at least one of the remaining channels among the plurality of channels.

In operation 705, the electronic device determines whether the data reception is finished.

In operation 705, when the data reception is not finished, the electronic device receives data through at least one channel among the plurality of channels, and may monitor at least one of the remaining channels, in operation 703.

When the data reception is finished, the electronic device monitors a plurality of usable channels (e.g., step 407 of FIG. 4).

In various embodiments, the electronic device may transmit and receive data by selectively configuring a channel of a plurality of antennas. For example, the electronic device may transmit and receive data by configuring the plurality of antennas to the same channel based on a diversity gain using the plurality of antennas. The electronic device may also transmit and receive data by configuring the plurality of antennas to different channels based on a diversity gain using the plurality of antennas.

Figure 8:
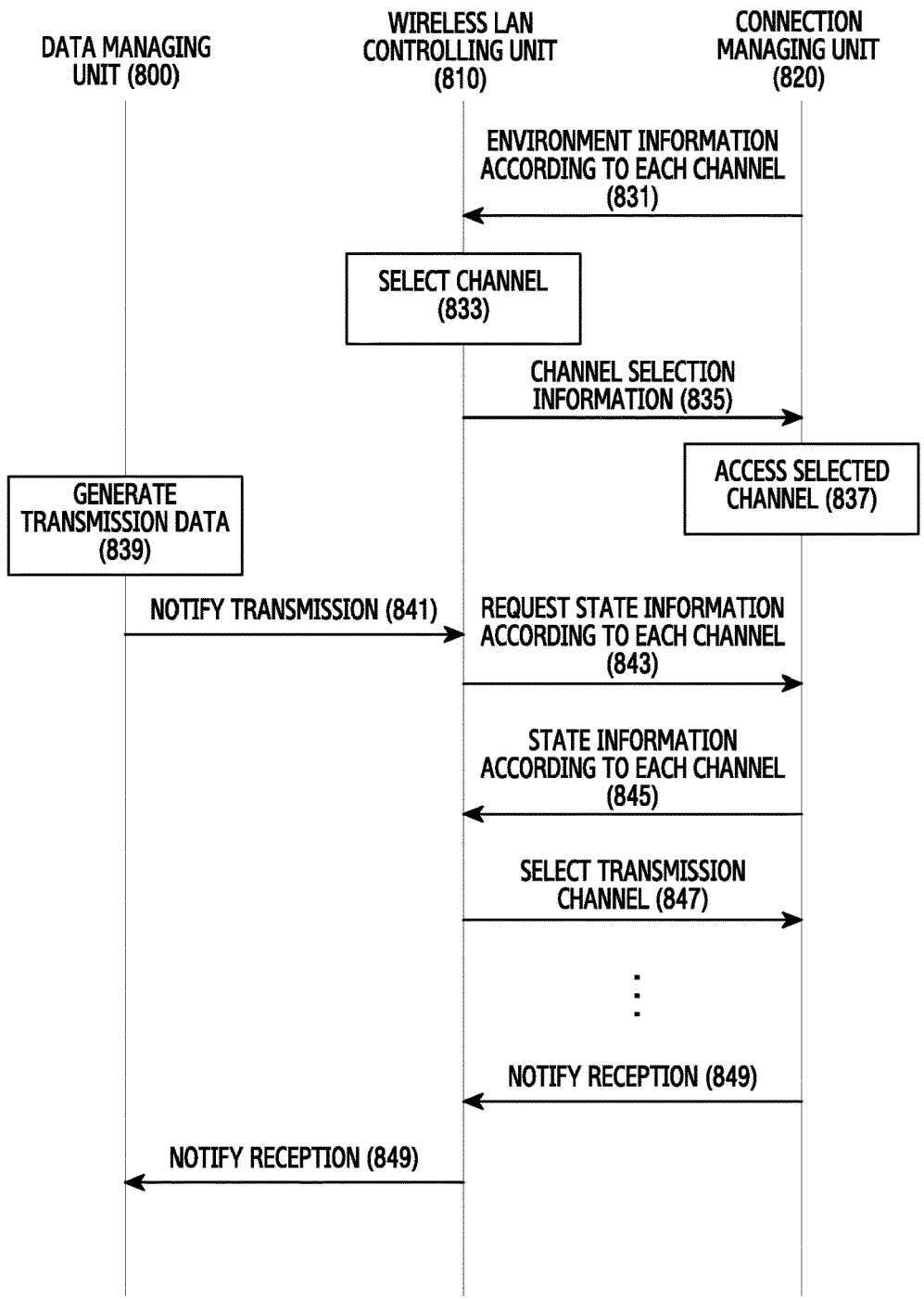
FIG. 8 illustrates a flow diagram of a signal for transmitting data through at least one channel in an electronic device according to an embodiment of the present disclosure.

FIG. 8 illustrates a flow diagram of a signal for transmitting data through at least one channel in an electronic device according to an embodiment of the present disclosure.

Referring to FIG. 8, an electronic device (e.g., the electronic device 1 122 of FIG. 1 or the electronic device 200 of FIG. 2) includes a data managing unit 800 (e.g., the data managing unit 312 of FIG. 3), a wireless LAN controlling unit 810 (e.g., the wireless LAN controlling unit 310 of FIG. 3) and at least one connection managing unit 820 (e.g., at least one connection controlling unit 300-1 to 300-N of FIG. 3).

At least one connection managing unit 820 transmits environment information (e.g., a monitoring result) for each channel to the wireless LAN controlling unit 810 in operation 831.

The wireless LAN controlling unit 810 selects a plurality of channels to use the plurality of channels for a wireless LAN service in the electronic device based on the environment information of each channel in operation 833. The wireless LAN controlling unit 810 transmits channel selection information of the plurality of channels to the connection managing unit 820 corresponding to each channel in operation 835.

The connection managing unit 820 accesses an AP for at least one channel based on the selection information of the plurality of channels provided from the wireless LAN controlling unit 810 in operation 837. For example, the connection managing unit 820 may access an AP corresponding to a specific channel based on the selection information of the plurality of channels provided from the wireless LAN controlling unit 810. In this case, the connection managing unit 820 may monitor a channel used by the electronic device to access the AP and at least one of the remaining channels. For example, the connection managing unit 820 may access at least one AP corresponding to each channel selected by the wireless LAN controlling unit 810 to monitor each channel.

According to an embodiment, when transmission data is generated in operation 839, the data managing unit 800 transmits transmission notification information to the wireless LAN controlling unit 810 in operation 841.

The wireless LAN controlling unit 810 sends a request for state information of each channel to the connection managing unit 820 in response to a reception of the transmission notification information from the data managing unit 800 in operation 843. For example, the wireless LAN controlling unit 810 may send a request for monitoring information of each channel to the connection managing unit 820.

The connection managing unit 820 transmits monitoring information for each channel to the wireless LAN controlling unit 810 in response to the request of the channel state information of the wireless LAN controlling unit 810 in operation 845.

The wireless LAN controlling unit 810 selects at least one channel for a data transmission based on the state information (e.g., monitoring information) of the channels of the plurality of channels provided from the connection managing unit 820 in operation 847. The wireless LAN controlling unit 810 transmits transmission channel selection information and data to be transmitted through a corresponding channel to the connection managing unit 820 that corresponds to at least one channel selected for the data transmission.

According to an embodiment, when each connection managing unit 820 receives a message indicating whether received data exists through a corresponding channel, each connection managing unit 820 transmits data reception notification information for the corresponding channel to the wireless LAN controlling unit 810 in operation 849.

The wireless LAN controlling unit 810 receives data through at least one channel based on the reception notification information received from the connection managing unit 820.

Figure 9:
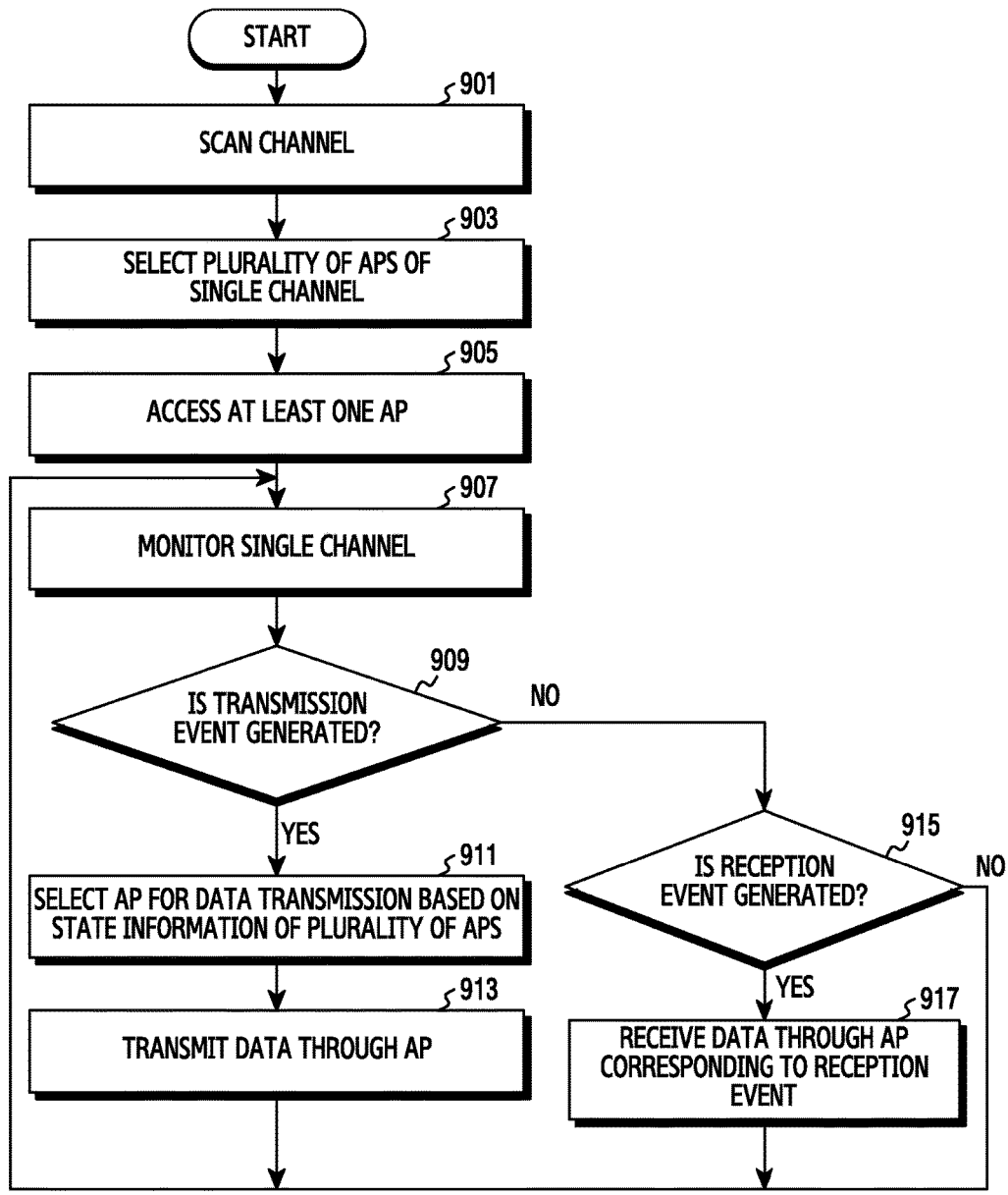
FIG. 9 illustrates a flowchart for transmitting and receiving data using a plurality of APs in an electronic device according to an embodiment of the present disclosure.

FIG. 9 illustrates a flowchart for transmitting and receiving data using a plurality of APs in an electronic device according to an embodiment of the present disclosure.

Referring to FIG. 9, in operation 901, an electronic device (e.g., the electronic device 1 122 of FIG. 1 or the electronic device 200 of FIG. 2) scans a channel. For example, the electronic device may obtain at least one of the number, signal strength, and state information of an AP included in each channel through a control message received through each channel.

In operation 903, the electronic device identifies a plurality of APs that may be accessed by the electronic device in an accessible channel based on network environment information collected through the channel scan.

In operation 905, the electronic device accesses at least one AP among the accessible APs. For example, the electronic device may access a plurality of accessible APs using different MAC addresses or IP addresses. The electronic device may also access any AP among the plurality of accessible APs, and may manage at least one of the remaining APs as a usable AP list.

In operation 907, the electronic device monitors a channel of the accessed AP. For example, the electronic device may obtain a signal strength and load information of each AP, which may be accessed by the electronic device in a corresponding channel through monitoring of the channel.

In operation 909, the electronic device determines whether a transmission event is generated. For example, the electronic device may determine whether data to be transmitted through a wireless LAN service is generated.

In operation 911, when the transmission event is generated, the electronic device selects an AP for data transmission based on state information (e.g., phase information and the like) of the plurality of APs. For example, the electronic device may select the AP for the data transmission based on at least one of the load information and the signal strength of the APs.

In operation 913, the electronic device transmits data through the AP selected in operation 911.

In operation 913, the electronic device may determine whether the data transmission is finished.

In operation 915, when a transmission event is not generated, the electronic device determines whether a reception event is generated. For example, the electronic device may determine whether a message indicating whether received data exists is received through a channel that is being monitored. For example, the message indicating whether the received data exists may include a Traffic Indication Message (TIM) and a Delivery TIM (DTIM).

When the reception event is not generated, the electronic device monitors the channel of the accessed AP in operation 907.

When the reception event is generated, the electronic device receives data through a corresponding channel in operation 917.

In the case of FIG. 9, when the electronic device monitors a single channel, the electronic device may identify a corresponding channel. In this case, the electronic device may identify the channel at a medium obtaining time (e.g., a time when the access to the AP is possible) by performing a medium use sensing (i.e., a carrier sensing).

Figure 10:
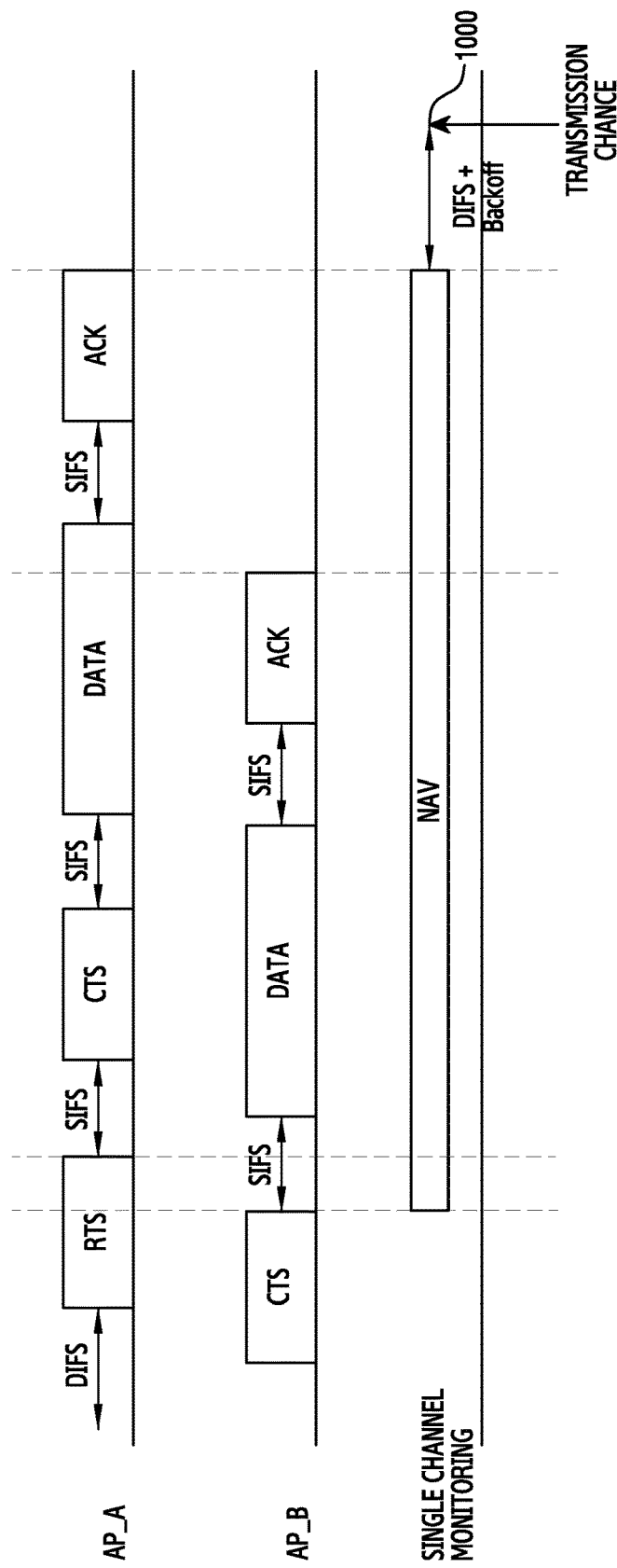
FIG. 10 illustrates a structure for obtaining a data transmission time in an electronic device according to an embodiment of the present disclosure.

FIG. 10 illustrates a structure for obtaining a data transmission time in an electronic device according to an embodiment of the present disclosure.

Referring to FIG. 10, the electronic device may obtain a medium obtaining time 1000 of a corresponding channel based on an NAV and a backoff corresponding to an operation of an AP A and an AP B. For example, the electronic device may determine the NAV of a corresponding channel based on a Request To Send (RTS), a Clear To Send (CTS), a Short InterFrame Space (SIFS) and a DCF InterFrame Space (DIFS) by the AP A and the APB.

Figure 11:
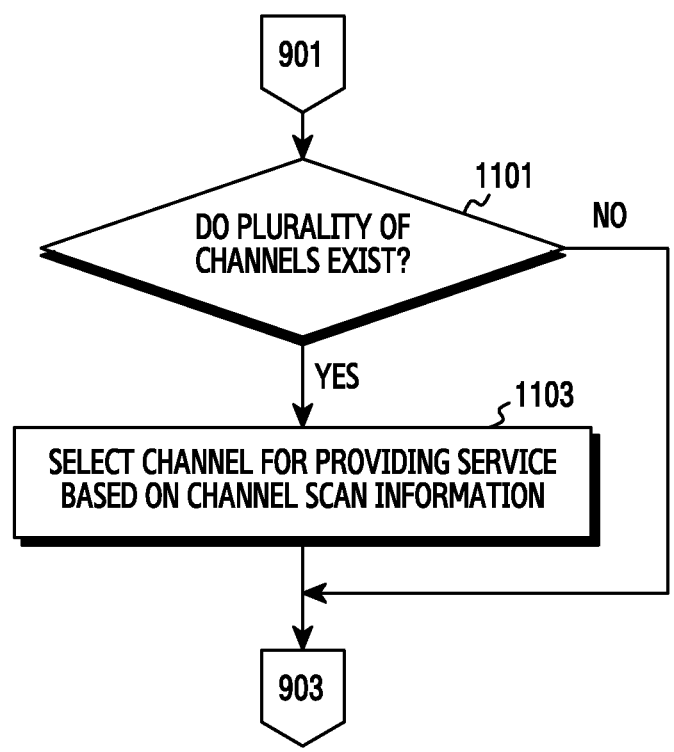
FIG. 11 illustrates a flowchart for selecting a channel which provides a service in an electronic device according to an embodiment of the present disclosure.

FIG. 11 illustrates a flowchart for selecting a channel that provides a service in an electronic device according to an embodiment of the present disclosure.

Referring to FIG. 11, in operation 1101, when the electronic device scans a channel (e.g., in operation 901 of FIG. 9), the electronic device determines whether a plurality of channels, which may be accessed by the electronic device, exist based on a scan result.

The electronic device may identify a plurality of APs that may be accessed by the electronic device in an accessible channel based on network environment information collected through the channel scan (e.g., in operation 903 of FIG. 9).

In operation 1103, the electronic device selects one channel based on the scan information of each channel. For example, the electronic device may obtain a result shown in Table 2 through a channel scan.

TABLE 2

| channel | AP address | BSSID | Supported Rate | Load |
|---|---|---|---|---|
| 1 | AP_A | BSSID_A | 1/2/5.5/6/9/11/12/12/18 | N |
| 2 | AP_B | BSSID_B | 1/2/5.5/6/9/11/12 | N |
|  | AP_C | BSSID_C | 1/2/5.5/6/9/11/12/18/24/36/48/54 | N |
| 3 | AP_D | BSSID_D | 1/2/5.5/6/9/11/12/18/24/36/48 | Y |

The electronic device may select a channel based on the number of APs using a corresponding channel and state information of the AP. For example, the electronic device may select a channel of which the number of the APs using the corresponding channel is comparatively low in order to select a channel of which a network complexity is low. For example, when a network complexity of channels is similar, the electronic device may select a channel of which the number of usable APs is comparatively high.

In operation 1103, the electronic device identifies a plurality of APs which may be accessed by the electronic device in a channel selected in operation 1103 (e.g., operation 903 of FIG. 9).

Figure 12:
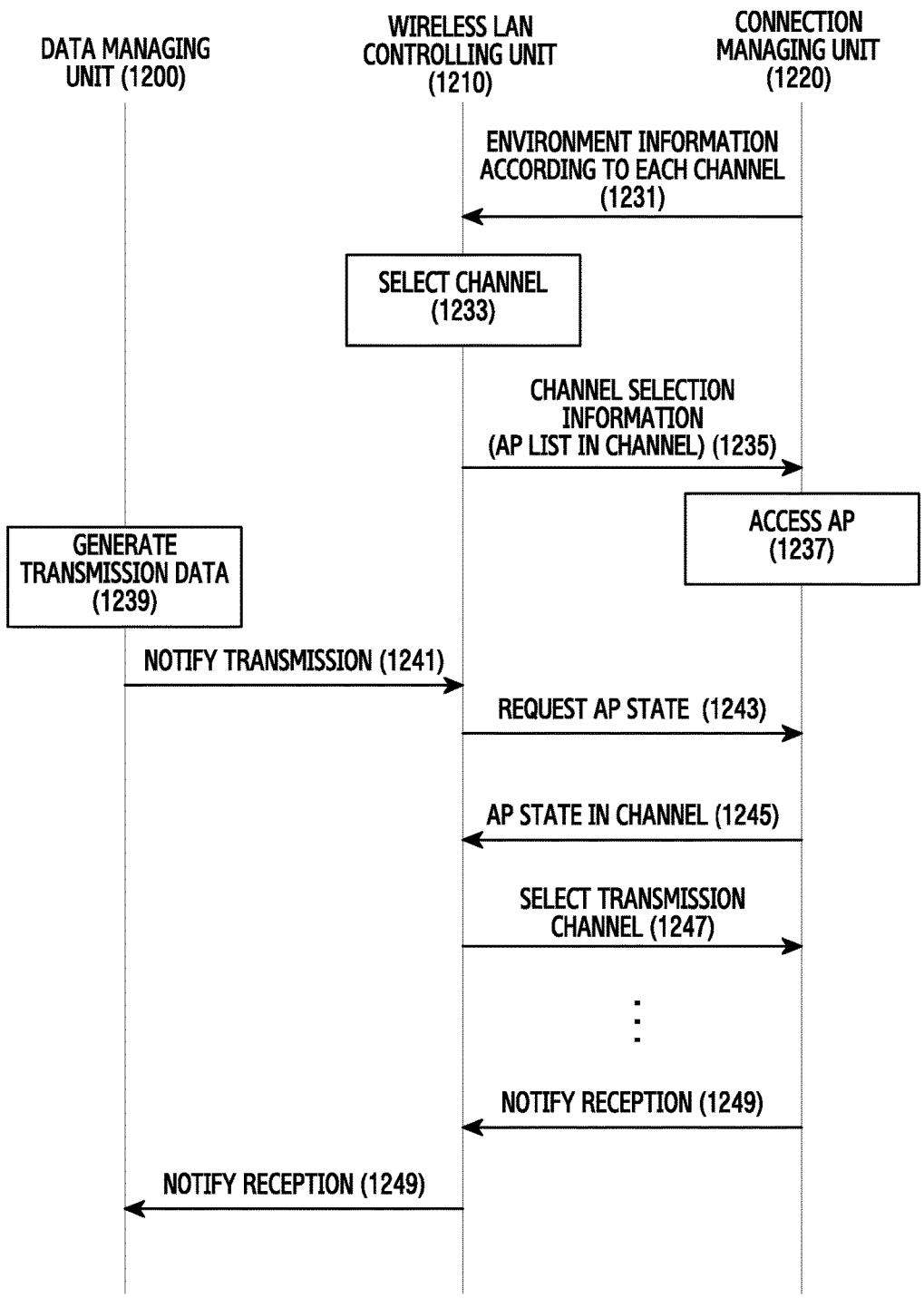
FIG. 12 illustrates a flow diagram of a signal for transmitting and receiving data using a plurality of APs in an electronic device according to an embodiment of the present disclosure.

FIG. 12 illustrates a flow diagram of a signal for transmitting and receiving data using a plurality of APs in an electronic device according to an embodiment of the present disclosure.

Referring to FIG. 12, an electronic device (e.g., the electronic device 1 122 of FIG. 1 or the electronic device 200 of FIG. 2) includes a data managing unit 1200 (e.g., the data managing unit 312 of FIG. 3), a wireless LAN controlling unit 1210 (e.g., the wireless LAN controlling unit 310 of FIG. 3) and at least one connection managing unit 1220 (e.g., at least one connection controlling unit 300-1 to 300-N of FIG. 3).

At least one connection managing unit 1220 transmits environment information (e.g., a monitoring result) for each channel to the wireless LAN controlling unit 1210 in operation 1231.

The wireless LAN controlling unit 1210 selects a channel to use for a wireless LAN service in the electronic device based on the environment information of each channel in operation 1233. The wireless LAN controlling unit 1210 transmits channel selection information to the connection managing unit 1220 in operation 1235.

The connection managing unit 1220 accesses at least one AP based on the channel selection information provided from the wireless LAN controlling unit 1210 in operation 1237. The connection managing unit 1220 may monitor the channel selected by the wireless LAN controlling unit 1210.

According to an embodiment, when transmission data is generated in operation 1239, the data managing unit 1200 transmits transmission notification information to the wireless LAN controlling unit 1210 in operation 1241.

The wireless LAN controlling unit 1210 sends a request for state information of APs usable in a channel to the connection managing unit 1220 in response to a reception of the transmission notification information from the data managing unit 1200 in operation 1243.

The connection managing unit 1220 transmits monitoring information for each AP to the wireless LAN controlling unit 1210 in response to the state information request of the APs of the wireless LAN controlling unit 1210 in operation 1245.

The wireless LAN controlling unit 1210 selects the AP for the data transmission based on the state information (e.g., monitoring information) of the APs provided from the connection managing unit 1220 in operation 1247. The wireless LAN controlling unit 1210 transmits AP selection information and data to be transmitted through a corresponding AP to the connection managing unit 1220 corresponding to the AP selected for the data transmission.

According to an embodiment, when the connection managing unit 1220 receives a message indicating whether received data exists through a channel, the connection managing unit 1220 transmits data reception notification information for a corresponding channel to the wireless LAN controlling unit 1210 in operation 1249.

The wireless LAN controlling unit 1210 receives data based on the reception notification information received from the connection managing unit 1220.

In various embodiments of the present disclosure, an electronic device may obtain a multi-antenna gain (e.g., a diversity gain) for a wireless LAN service of a multi-antenna service using a plurality of antennas. For example, the electronic device may increase a data transmission rate or data transmission reliability for a wireless LAN service using the plurality of antennas.

According to an embodiment, an electronic device may selectively operate a wireless LAN service using a plurality of antennas based on a multi-antenna gain using the plurality of antennas. For example, when the multi-antenna gain expected, according to a provision of a multi-antenna service using the plurality of antennas, is greater than or equal to a reference value, the electronic device may transmit and receive data using the plurality of antennas. When the multi-antenna gain expected, according to a provision of a multi-antenna service using the plurality of antennas, is less than or equal to the reference value, the electronic device may scan or monitor another channel or AP through at least one of remaining antennas while maintaining the access to at least one AP through at least one antenna. The electronic device may determine the multi-antenna gain based on at least one of a reduction of the signal strength, a reduction of the channel share and a rank reduction of the channel according to a provision of the multi-antenna service.

According to an embodiment, when an electronic device searches for an AP that is to be accessed by the electronic device for the first time (i.e., when the electronic device performs a channel scan), the electronic device may sequentially scan each channel that may be used by the electronic device. In this case, the electronic device may consistently perform the channel scan using at least one of the remaining antennas while providing a wireless LAN service by accessing an AP of a specific channel using at least one antenna during the channel scan.

According to various embodiments, a method for operating an electronic device (the electronic device 1 122 of FIG. 1 or the electronic device 200 of FIG. 2) may comprise performing a channel scan, selecting a plurality of channels based on channel scan information, accessing at least one Access Points (APs) corresponding to at least one channel among the plurality of channels, and monitoring the plurality of channels in a state in which the access at least one AP is maintained.

According to various embodiments of the present disclosure, a method for operating an electronic device (the electronic device 1 122 of FIG. 1 or the electronic device 200 of FIG. 2) may comprise performing a channel scan, identifying a plurality of Access Points (APs) based on information on the channel scan, monitoring a channel of the APs, selecting at least one AP among the APs based on information on the monitoring of the channel, and transmitting data through at least one selected AP.

An electronic device and a method according to various embodiments may disperse traffic between APs and improve data transmission performance of the electronic device, by selecting at least one channel or AP for transmitting and receiving data based on state information of a plurality of channels or a plurality of Access Points (APs).

An electronic device and a method according to various embodiments identify (e.g., scan or monitor) state information of an adjacent AP using at least one of remaining antennas, while accessing an AP using at least one antenna by independently operating a plurality of antennas. Thus, the electronic device and the method may improve data transmission performance of the electronic device by effectively coping with a change of a wireless LAN environment.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When an instruction is implemented by one or more processors (for example, the processor 220), one or more processors may execute a function corresponding to the instruction. The computer-readable storage medium may be, for example, the memory 230.

The computer readable storing medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
   a communication interface; and
   a processor configured to:
   perform a channel scan via the communication interface,
   select a plurality of channels usable by the electronic device based on at least one of load information and supportable transmission rates of each channel included in channel scan information,
   access at least one Access Point (AP) through at least one first channel among the plurality of channels,
   monitor, while access to the at least one AP is maintained, state information of the plurality of channels including the at least one first channel used to access the at least one AP,
   select at least one second channel using a medium access state of each of the plurality of channels and the monitored state information of the plurality of channels including the at least one first channel used to access the at least one AP, and transmit data using the selected at least one second channel among the plurality of channels, via the communication interface,
   wherein the medium access state includes at least one of a contention window (CW) and a network allocation vector (NAV).

2. The electronic device of claim 1, wherein the communication interface includes a plurality of connection managers, which manage the medium access state of each of the plurality of channels.

3. The electronic device of claim 1, wherein the processor is configured to control access to at least one AP using a plurality of Medium Access Control (MAC) addresses allocated to the communication interface, an expansion address of a MAC address allocated to the communication interface, or a plurality of Internet Protocol (IP) addresses allocated to the communication interface.

4. The electronic device of claim 1, wherein the processor is further configured to control access to different APs during different time periods using a Medium Access Control (MAC) address allocated to the communication interface.

5. The electronic device of claim 1, wherein the processor is further configured to select the at least one second channel based on at least one of a priority, a signal strength, and a medium obtaining time of each channel.

6. A method for operating an electronic device, the method comprising:
   performing a channel scan;
   selecting a plurality of channels usable by the electronic device based on at least one of load information and supportable transmission rates of each channel included in channel scan information;
   accessing at least one Access Point (AP) through at least one first channel among the plurality of channels;
   monitoring, while access to the at least one AP is maintained, state information of the plurality of channels including the at least one first channel used to access the at least one AP;
   selecting at least one second channel using a medium access state of each of the plurality of channels and the monitored state information of the plurality of channels including the at least one first channel used to access the at least one AP; and
   transmitting data through the selected at least one second channel among the plurality of channels,
   wherein the medium access state includes at least one of a contention window (CW) and a network allocation vector (NAV).

7. The method of claim 6, wherein accessing at least one AP comprises accessing at least one AP using at least one of a plurality of Medium Access Control (MAC) addresses allocated to a communication interface of the electronic device, an expansion address of a MAC address allocated to the communication interface, and a plurality of Internet Protocol (IP) addresses allocated to the communication interface.

8. The method of claim 6, wherein accessing at least one AP comprises accessing different APs, during different time periods, using a Medium Access Control (MAC) address allocated to a communication interface of the electronic device.

* * * * *